(12) United States Patent
Ichino

(10) Patent No.: US 6,967,784 B2
(45) Date of Patent: Nov. 22, 2005

(54) LENS BARREL MECHANISM

(75) Inventor: Kazushige Ichino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/763,988

(22) Filed: Jan. 23, 2004

(65) Prior Publication Data

US 2004/0150891 A1  Aug. 5, 2004

(30) Foreign Application Priority Data

Jan. 28, 2003 (JP) .............................. 2003-018148

(51) Int. Cl.[7] .......................................... G02B 15/14
(52) U.S. Cl. ...................... 359/694; 359/700; 359/704
(58) Field of Search ............................... 359/704, 612, 359/823, 694, 700; 396/341, 349

(56) References Cited

U.S. PATENT DOCUMENTS 5,365,373 A * 11/1994 Tanaka ........................ 359/601

6,195,212 B1   2/2001 Miyamoto ................... 359/699

FOREIGN PATENT DOCUMENTS

JP   2000-147352   5/2000
JP   2000-347085   12/2000

* cited by examiner

*Primary Examiner*—Ricky Mack

(74) *Attorney, Agent, or Firm*—Cowan, Liebowitz & Latman, P.C.

(57) ABSTRACT

A unit for performing light blocking and dust proof is disclosed. The light blocking and dust proof unit is fixed to a first optical unit, and is mounted to a second optical unit. The light blocking and dust proof unit is mounted to the second optical unit so as to be movable in the optical axial direction relative to the second optical unit, and to be regulated by different regulating portions of the second optical unit between cases where the light blocking and dust proof unit is contracted and where the light blocking and dust proof unit is expanded. The size of the light blocking and dust proof unit having such a structure can be reduced.

6 Claims, 4 Drawing Sheets

LENS BARREL MECHANISM

BACKGROUND OF THE INVENTION

1. Field of the Invention

The present invention relates to an improvement of a lens barrel mechanism which includes a bellows-shaped unit for performing light blocking and dust proof, and which is capable of being installed to a camera and the like.

2. Related Background Art

In conventional collapsible mount type camera lens barrels and zoom type camera lens barrels, there have been proposed cameras in which an expandable and contractible bellows-shaped member for performing light blocking and dust proof is provided between optical units or driving mechanisms for the purposes of preventing leakage of light and entering of sand and dust through between a variety of kinds of optical units movable in the optical axial direction, or driving mechanisms for moving these optical units in the optical axial direction.

As a method for fixing the bellows-shaped member, as disclosed in U.S. Pat. No. 6,195,212 and Japanese Patent Application Laid-Open No. 2000-147352, it is general to use a mechanism in which front and rear ends of the bellows-shaped member are fixed to respective optical units or driving mechanisms, and the bellows-shaped member is moved interlocking with relative movement in the optical axial direction between these units or mechanisms while the entire length of the bellows-shaped member is changed.

Further, in Japanese Patent Application Laid-Open No. 2000-347085, an end portion of a bellows-shaped member on an object side is fixed to a frame of a lens barrel, but the other end on a side of an image surface is only brought into contact with a flange portion of a lens supporting frame. In the apparatus disclosed in this Japanese reference, the bellows-shaped member is formed of an elastic rubber, and the bellows-shaped rubber member is assembled by compressive charging, using its rubber elasticity, such that its contact with the flange portion cannot be released even in the event that the lens supporting frame is moved in the optical axial direction relative to the frame of the lens barrel, due to expansion or contraction of the bellows-shaped rubber member in accordance with the relative movement.

In recent collapsible mount type cameras and zoom type cameras, however, downsizing increasingly advances, and it is accordingly essential to reduce sizes and thicknesses of individual components of the camera. On the other hand, a large zoom magnification is needed. Accordingly, the following lens barrel structure is required. In such a lens barrel structure, various optical units and driving mechanisms for moving these optical units in the optical axial direction can be largely moved while small components are used. In such a lens barrel structure, it is naturally inevitable for some components to be moved largely relative to each other (the amount of a distance between these components is largely changed).

As the downsizing proceeds as discussed above, a space for containing the bellows-shaped member in the camera decreases. Accordingly, the length of the bellows-shaped member in its contracted state needs to be reduced, as the result of which the length of the bellows-shaped member in its expanded state is also liable to decrease.

Therefore, in the construction in which both opposite ends of the bellows-shaped member are fixed as in the above-discussed U.S. Pat. No. 6,195,212 and Japanese Patent Application Laid-Open No. 2000-147352, it is difficult to satisfy required amounts of relative movement of the optical unit and the driving mechanism to which ends of the bellows-shaped member are fixed.

Further, in such a construction as disclosed in the above-discussed Japanese Patent Application Laid-Open No. 2000-347085, the amount of the relative movement is not restricted since one end of the bellows-shaped member is only put under a contact condition while the other end thereof is fixed. However, in the event that the components are spaced from each other more than a freely-expanded length of the bellows-shaped member, it is likely that the bellows-shaped member cannot achieve functions of light blocking and dust proof.

SUMMARY OF THE INVENTION

The present invention has been made in consideration of the above situation, and has as its object to provide a lens barrel mechanism which is capable of reducing the size of a unit for performing light blocking and dust proof without damaging functions of the light blocking and the dust proof, and capable of achieving reduction in its size.

According to the present invention, the foregoing object is attained by providing a lens barrel mechanism which includes a first optical unit; a second optical unit; and a bellows-shaped unit for performing light blocking and dust proof which is disposed between the first optical unit and the second optical unit so as to be expanded and contracted interlocking with relative movement in an optical axial direction between the first optical unit and the second optical unit; and in which one end of the bellows-shaped unit is fixed to the first optical unit, and the other end of the bellows-shaped unit is mounted to the second optical unit such that the other end of the bellows-shaped unit can be moved in the optical axial direction relative to the second optical unit, and the other end of the bellows-shaped unit can be regulated by different regulating portions of the second optical unit between cases where the bellows-shaped unit is contracted and where the bellows-shaped unit is expanded.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE PREFERRED EMBODIMENTS

Preferred embodiments of the present invention will be described in detail in accordance with the accompanying drawings.

Figure 1:
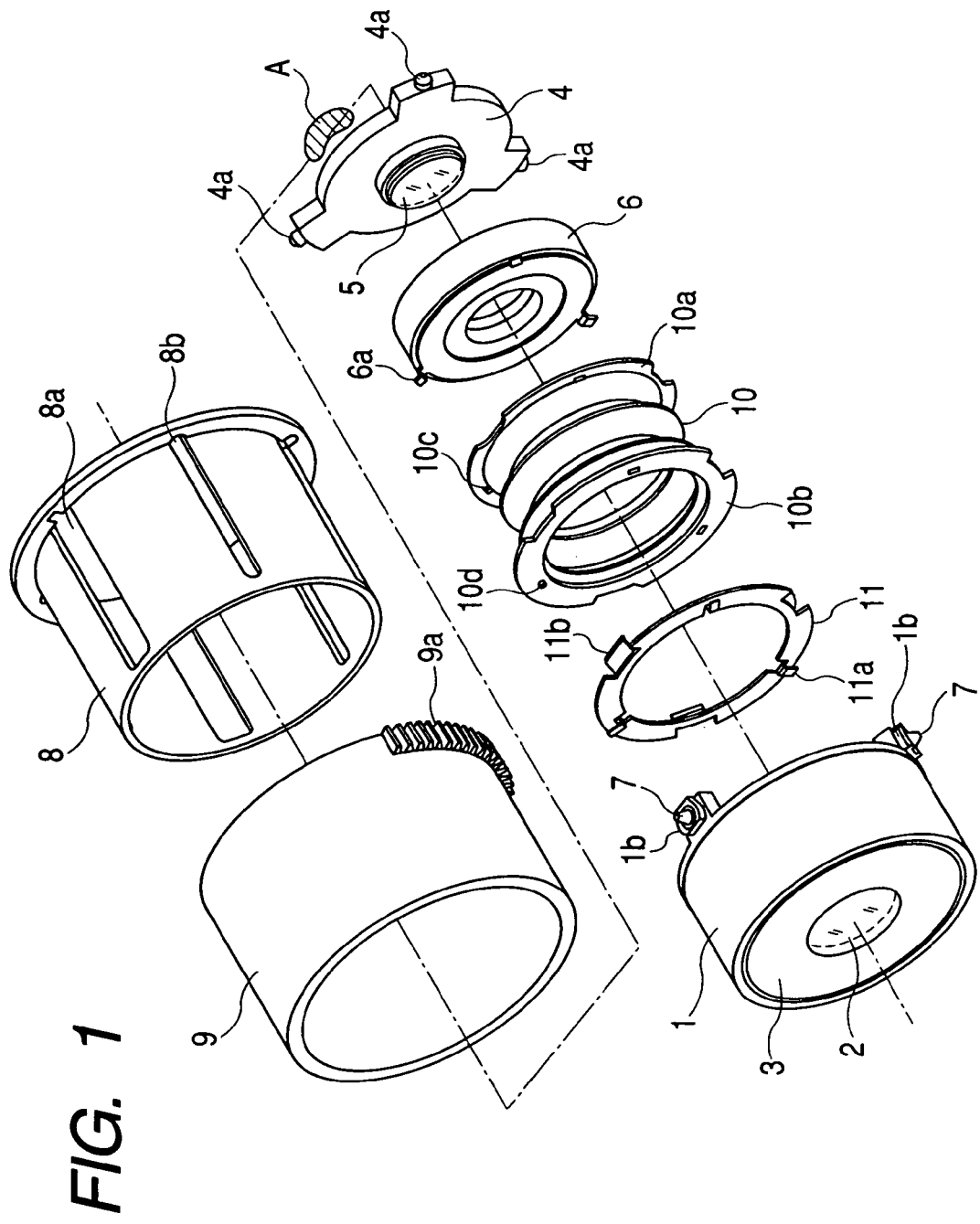
FIG. 1 is a perspective view illustrating an embodiment of a lens barrel mechanism according to the present invention.
Figure 2:
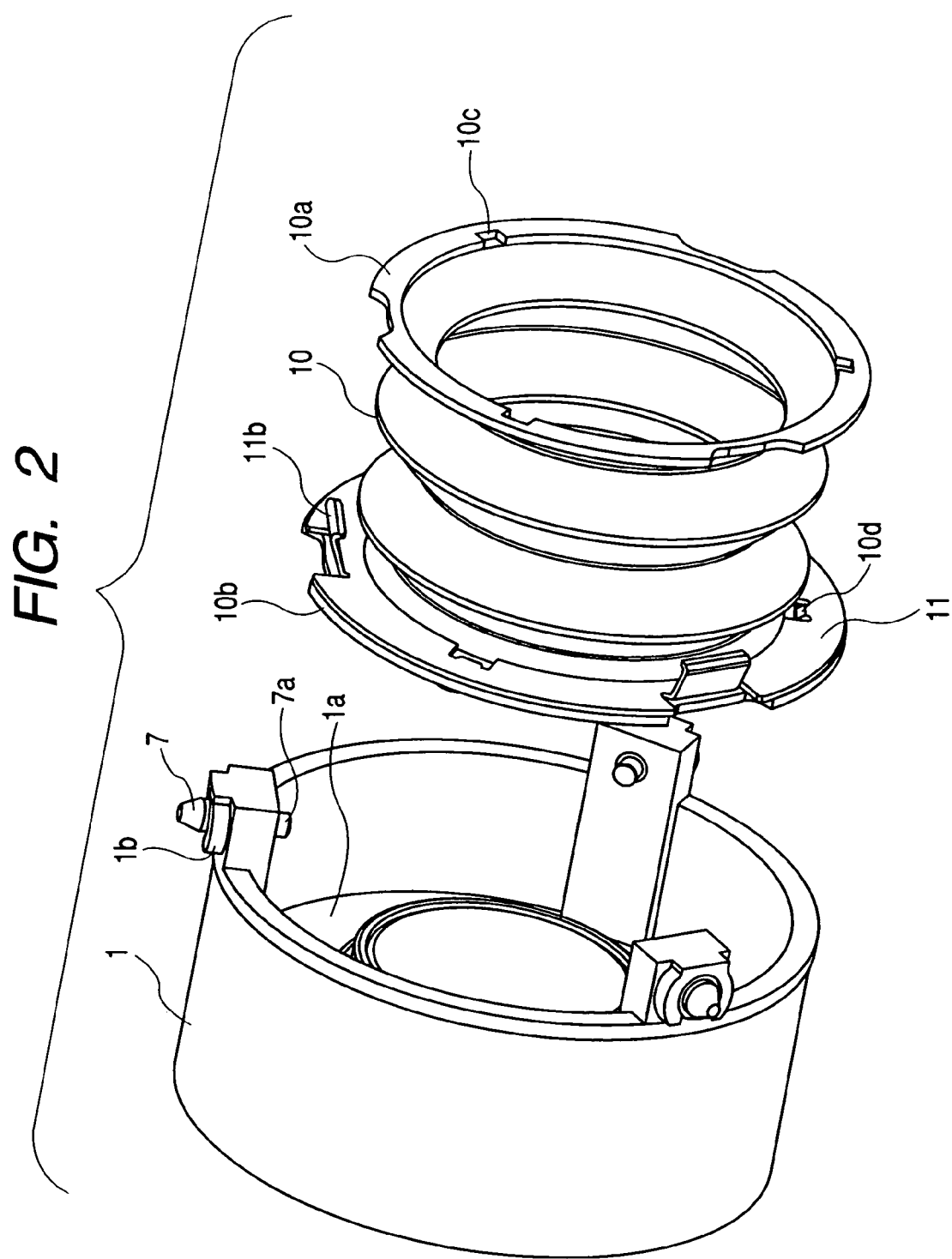
FIG. 2 is an enlarged view illustrating principal components of the embodiment of the lens barrel mechanism according to the present invention.
Figure 3:
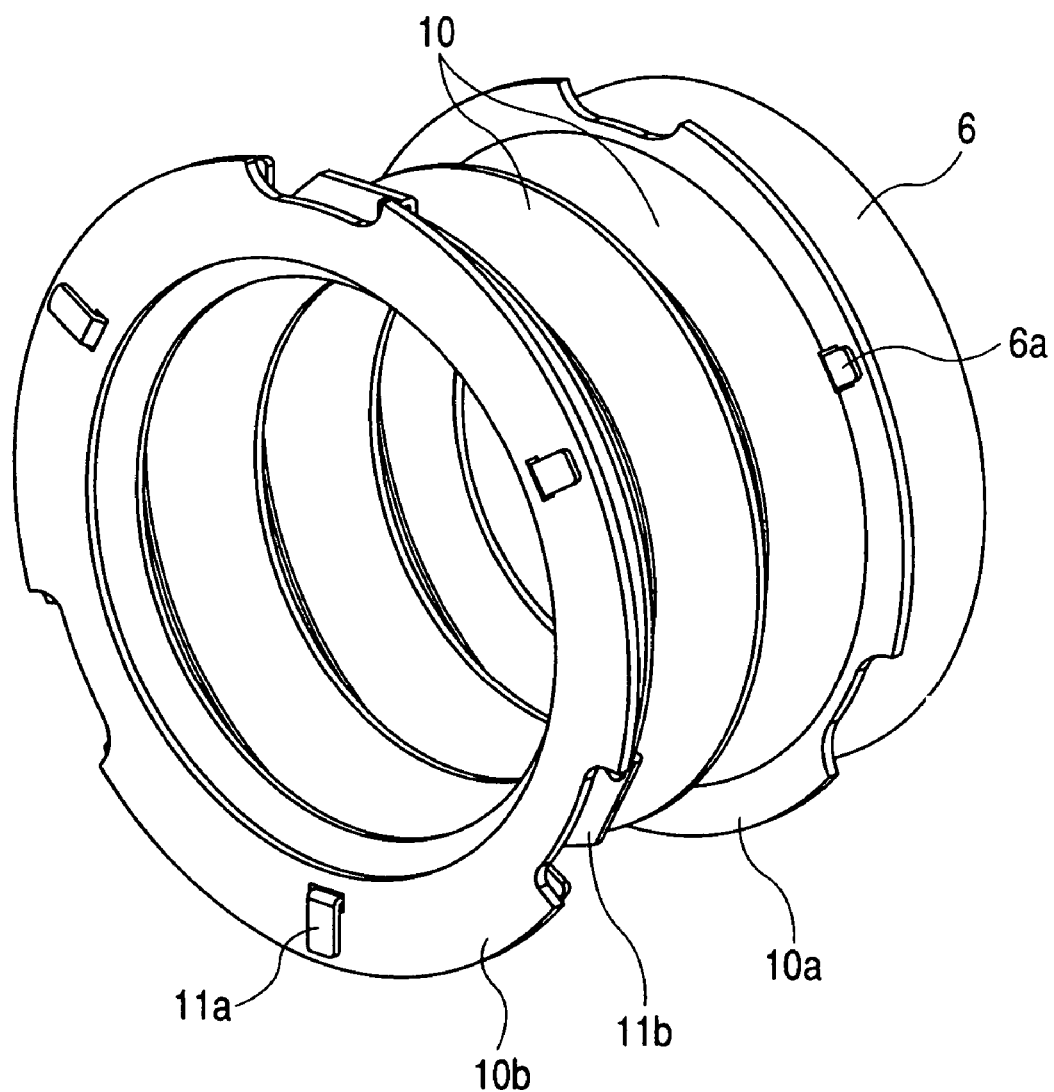
FIG. 3 is likewise an enlarged view illustrating principal components of the embodiment of the lens barrel mechanism according to the present invention.
Figure 4A:
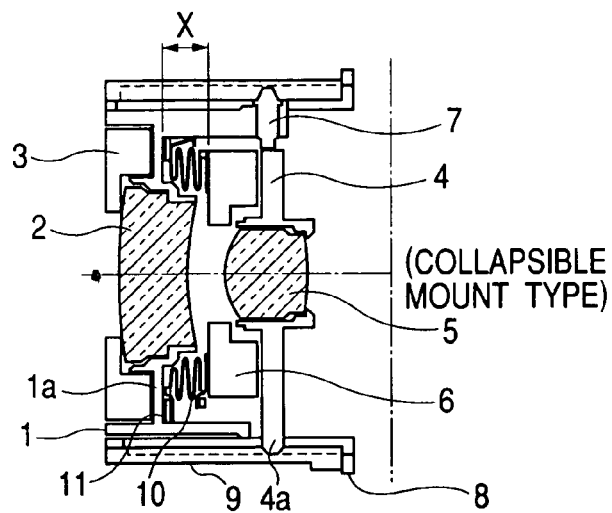
FIGS. 4A, 4B and 4C are views illustrating movements of the embodiment of the lens barrel mechanism according to the present invention, respectively.
Figure 4B:
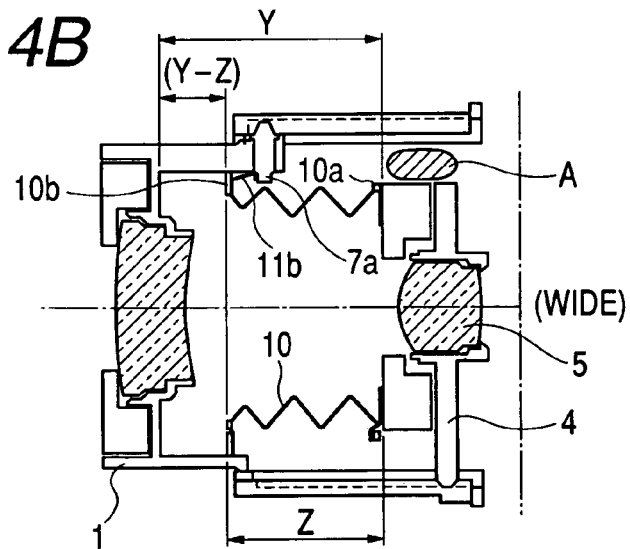
Figure 4C:
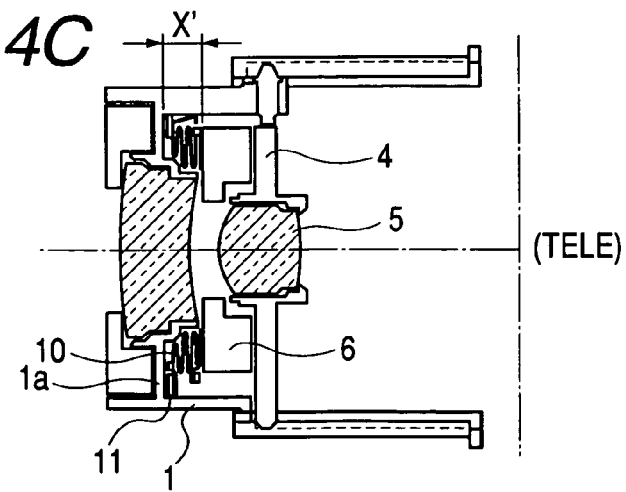

FIGS. 1, 2, 3 and 4A to 4C illustrate the structure of an embodiment of a lens barrel mechanism according to the present invention. More specifically, FIG. 1 is a disassembled enlarged view illustrating the entire structure of the lens barrel mechanism, FIGS. 2 and 3 are enlarged views illustrating principal components of the lens barrel mechanism, and FIGS. 4A, 4B and 4C are views each illustrating a condition under which a bellows-shaped member is moved interlocking with the movement of the lens barrel mechanism (a collapsed condition, a wide-angle condition, or a telephoto condition).

The overall structure of the lens barrel mechanism will be initially described with reference to FIGS. 1 to 3.

In the illustrated embodiment of the present invention, a bellows-shaped member is used in a collapsible mount type lens barrel mechanism in which two zoom lens groups are employed. A first lens group 2 is held by a first group lens barrel 1, and a barrier mechanism 3 is provided on a front surface of the lens barrel 1. A second lens group 5 is held by a second group lens barrel 4, and a shutter mechanism 6 is fixed to the lens barrel 4. Three first lens group cam pins 7 are forcedly fitted into the first group lens barrel 1, and three second lens group cam pins 4a are formed in the second group lens barrel 4 as a unit.

Each side projection 1b formed around the periphery of the first lens group cam pin 7 of the first group lens barrel 1 is key-fitted into a straight groove 8a of a translation cam 8. The second cam pin 4a is key-fitted into another straight groove 8b of the translation cam 8. Further, each of the cam pins 7 and 4a is cam-coupled to a cam groove (not shown) formed on an inner side surface of a cam cylinder 9. The cam groove (not shown) includes a cam curve satisfying a predetermined optical condition for moving the first and second lens groups 2 and 5 with a distance between them being changed to vary the focal length, and a cam curve for collapsing movement. The cam cylinder 9 is fitted into the translation cylinder 8 in a rotatable manner, and the translation cylinder 8 is fixed to a camera (not shown). Further, a gear 9a is formed on an outer surface of the cam cylinder 9, and driving force is transmitted to the cam cylinder 9 from a driving unit (not shown) through the gear 9a.

In the above-discussed construction, in the event that the driving force is transmitted to the cam cylinder 9 from the driving unit (not shown) such that the cam cylinder 9 can be rotated about the translation cylinder 8, the first and second group lens barrels 1 and 4 are translated along the optical axis without rotational motion.

FIGS. 4A to 4C illustrate movements from the collapsed condition to the wide-angle condition and the telephoto condition.

In the foregoing description, a general construction of a lens barrel mechanism of a two zoom lens group type has been described.

Description will now be made to components in connection with the lens barrel mechanism of this embodiment of the present invention.

A bellows-shaped member 10 capable of being freely expanded and contracted is provided between the first group lens barrel 1 and the second group lens barrel 4. As a material of a bellows-shaped member used in recent cameras, such a material as is capable of being totally elastically deformed, such as a silicone rubber, is often used. In this embodiment, when such a material is used in the bellows-shaped member having a rotationally symmetrical configuration, the member can be freely expanded and contracted with being entirely deformed elastically. It is, however, also possible to use such a bellows-shaped member as disclosed in FIG. 6 of Japanese Patent Application Laid-Open No. H8-304903, which is formed with a rigid material and is capable of being deformed only at its folding portion, in this embodiment since the member can be freely expanded and contracted when it is shaped into a polygonal configuration.

As illustrated in FIGS. 1 to 3, the bellows-shaped member 10 is provided with a first flange portion 10a and a second flange portion 10b formed at its both opposite ends, respectively. Three holes 10c for fixation are formed in the flange portion 10a, and three holes 10d for fixation are formed in the flange portion 10b. Further, three hooking claws 6a are formed in the shutter mechanism 6 as a unit. When the hooking claws 6a are inserted in the holes 10c of the first flange portion 10a, the first flange portion 10a is integrally fixed to the shutter mechanism 6 and the second group lens barrel 4. Furthermore, three hooking claws 11a are formed in a guide member 11. When the hooking claws 11a are inserted in the holes 10d of the second flange portion 10b, the second flange portion 10b is integrally fixed to the guide member 11.

When the second flange portion 10b is to be connected to the guide member 11, the second flange portion 10b is shrunk by folding and contraction, and is passed through an inner opening of the guide member 11 and combined with the guide member 11, since the bellows-shaped member 10 is made of a soft silicone rubber. Further, also when hooked with the hooking claws 6a and 11a, the flange portions 10a and 10b are stretched using characteristics of the rubber, and combined with the hooking claws 6a and 11a, respectively.

It should be noted that the guide member 11 is held in the first group lens barrel 1 movably along the optical axial direction. More specifically, as illustrated in FIG. 2, the shape of the inner side surface of the first group lens barrel 1 viewed from its front side is made approximately the same as the peripheral shape of the guide member 11 viewed from its front side, and a certain degree of clearance is set between those shapes. Accordingly, the guide member 11 can be moved along the optical axial direction without being rotated in the first group lens barrel 1.

The movable range of the guide member 11 relative to the first group lens barrel 1 is determined in the following manner.

The front end of the movable range is defined by the flange portion 1a of the first group lens barrel 1 (see FIGS. 4A and 4C). The rear end of the movable range is defined by a position whereat a root portion 7a of the first lens group cam pin 7, which protrudes from the inner side surface of the first group lens barrel 1, is brought into contact with a stand-up portion 11b of the guide member 11 (see FIG. 4B). As described above, the inner side surface of the first group lens barrel 1 and the peripheral shape of the guide member 11 are similar to each other, and hence, without the root portion 7a, the guide member 11 would come out of the lens barrel 1, and the rear end could not be defined. However, since the root portion 7a of the first lens group cam pin 7, which is conventionally unnecessary, is projected inwardly, the root portion 7a impinges against the rear side of the guide member 11 at the rear end such that the guide member 11 can be prevented from coming out of the first group lens barrel 1, as illustrated in FIG. 4B. Accordingly, when the peripheral shape of the second flange portion 10b of the bellows-shaped member 10 is made approximately the same as the peripheral shape of the guide member 11, the second flange portion 10b can be prevented from coming out of the inner side of the first group lens barrel 1 while the second flange portion 10b can move relative to the first group lens barrel 1 in the optical axial direction.

Motions of members and lens groups of the above-discussed lens barrel mechanism under the collapsed, wide-angle and telephoto conditions will be described with reference to FIGS. 4A to 4C.

At the time of the collapsed condition of FIG. 4A in this embodiment, the first group lens barrel 1 and the second group lens barrel 4, i.e., the first lens group 2 and the second lens group 5, are brought close to each other, and are contained in the camera. When the condition is changed from the collapsed condition of FIG. 4A to the wide-angle condition of FIG. 4B, the first lens group 2 is moved forward toward the object side (a left side in FIG. 4B) while the second lens group 5 is moved rearward toward the image surface side. The distance between those lens groups 2 and 5 is thus widened. Further, when the condition is changed from the wide-angle condition of FIG. 4B to the telephoto condition of FIG. 4C, the second lens group 5 is again moved forward toward the object side, and brought close to the first lens group 2.

Movement of the bellows-shaped member 10 at the time of the above-discussed motions is as follows. The bellows-shaped member 10 is contracted under the collapsed condition, is expanded under the wide-angle condition, and is again contracted under the telephoto condition. In the last case, the overall bellows-shaped member 10 is moved forward along the optical axial direction together with that contracting movement.

In a situation from the collapsed condition of FIG. 4A to the wide-angle condition of FIG. 4B, the second group lens barrel 4 and the second lens group 5 are intentionally moved rearward. In general, a collapsible mount type lens barrel mechanism serves as a mechanism for moving a lens group forward (toward the object side), and it is infrequent to move the lens barrel mechanism rearward as in this embodiment. Here, FIG. 4B is a view for explaining the function of the bellows-shaped member 10, and accordingly FIG. 4B depicts the motion of the bellows-shaped member 10 in an exaggerated manner. In this embodiment, therefore, description will be made in such a state.

Under the collapsed and telephoto conditions under each of which the lens groups are moved close to each other, the bellows-shaped member 10 is contracted, and its entire length is X or X'. It is not necessary to equalize the magnitudes X and X' (lengths of the contracted bellows-shaped member 10) to each other, and these magnitudes are determined by respective factors of the lens barrel mechanism. In this embodiment, the magnitude X' is assumed to represent the most contracted length, for example. Further, though the distance between the lens groups is largest under the wide-angle condition in this embodiment, it is possible, depending on optical conditions, to construct a lens structure in which the distance is shortened under the wide-angle condition while the distance is widened under the telephoto condition. In the present invention, the optical conditions can be arbitrarily selected, and it is characterized by the condition under which the bellow-shaped member is expanded, the condition under which the bellow-shaped member is contracted, and the movement at these times.

As illustrated in FIG. 4C, the bellow-shaped member can be contracted to the magnitude X' which corresponds to a space between the flange portion 1a of the first group lens barrel 1 and the shutter mechanism 6. In the event that the distance between the flange portion 1a of the first group lens barrel 1 and the shutter mechanism 6 is expanded to a distance Y as illustrated in FIG. 4B, the length of the bellows-shaped member must also be expanded to the length Y in the case of the structure of the above-discussed U.S. Pat. No. 6,195,212 or Japanese Patent Application Laid-Open No. 2000-147352. In this embodiment, however, the length of the bellows-shaped member 10 only needs to be expanded to a length Z at which the root portion 7a of the first lens group cam pin 7 protruding from the inner side surface of the first group lens barrel 1 impinges the stand-up portion 11b of the guide member 11. In other words, the bellows-shaped member 10 need not be expanded by a length Y-Z.

In connection with the function of the bellows-shaped member 10, the bellows-shaped member 10 under the wide-angle condition of FIG. 4B can effectively block light which is to be transmitted through the first lens group 2 and a space "A". The space "A" is a space to which the first lens group cam pin 7 is moved under the collapsed condition illustrated in FIG. 4A, and therefore such a light blocking member as blocks light passing through the space "A" cannot be provided in the second group lens barrel 4. Accordingly, the bellows-shaped member 10 highly effectively functions in this embodiment as discussed above.

In this embodiment, although the overall length of the bellows-shaped member 10 must be originally contracted and expanded from X' to Y from the structural standpoint, the actual contraction and expansion lengths only need to be from X' to Z due to the structure in which the bellows-shaped member 10 is contracted by the impingement of its second flange portion 10b against the flange portion 1a of the first group lens barrel 1 at the time of contraction, while the bellows-shaped member 10 is expanded by impingement of its second flange portion 10b against the root portion 7a of the first lens group cam pin 7, which is different from the flange portion 1a 1, at the time of expansion. Thus, the length of Y-Z can be shortened, and accordingly the size of the bellows-shaped member 10 can be further reduced, leading to the downsizing of the camera.

In this embodiment, the bellows-shaped member 10 is used for the purposes of blocking light, but it can also be used for the dust proof without any structural change.

Further, in this embodiment, the second flange portion 10b of the bellows-shaped member 10 functions integrally with the guide member 11 (the stand-up portion 11b), and particularly under the wide-angle condition of FIG. 4B, the stand-up 11b impinges against the root portion 7a of the cam pin 7. The reason therefor is that the strength of the second flange portion 10b is structurally weak. For example, if the rubber hardness of the second flange portion 10b is strengthened, or if its thickness is increased, the guide member 11 can be naturally omitted.

In the foregoing description, description has been made to the lens barrel mechanism including the bellows-shaped member for performing light blocking and dust proof. The present invention is, however, also applicable to a lens barrel mechanism including a bellows-shaped member for performing dust proof only. Further, though reference has been made to the structure in which front and rear ends of the bellows-shaped member are held by the lens barrel and the shutter mechanism, respectively, these ends can also be mounted to driving mechanisms for moving these lens barrel and shutter mechanism, respectively.

According to the above-discussed embodiment, there has been provided a lens barrel mechanism which includes a first unit (the shutter mechanism 6, the second group lens barrel 4, and the second lens group 5); a second unit (the first group lens barrel 1, the first lens group 2, and the first lens group cam pin 7); and a bellows-shaped unit 10 for performing light blocking and dust proof (also including the guide member 11 in the above embodiment) which is disposed between the first unit and said second unit so as to be expanded and contracted interlocking with relative movement in the optical axial direction between the first unit and the second unit, and prevent light and dust from entering through between the first and second units, and driving mechanisms for moving them in the optical axial direction; and in which a first flange portion 10a at one end of the bellows-shaped member 10 is fixed to the first unit, and a second flange portion 10b at the other end of the bellows-shaped member 10 is mounted to the second unit such that the second flange portion can be moved in the optical axial direction relative to the second unit, and the second flange portion can be regulated by different regulating portions (the flange portion 1a of the first group lens barrel 1, and the root portion 7a of the first lens group cam pin 7) of the second unit between cases where the bellows-shaped member 10 is contracted and where the bellows-shaped member 10t is expanded.

Therefore, the bellows-shaped member 10 with a length that is shorter than an originally needed length (in the optical axial direction) can be used as the unit for performing dust proof and light blocking, and it is accordingly possible to reduce sizes of a lens barrel mechanism, and overall optical instrument such as a camera to which the lens barrel mechanism is installed.

As described in the foregoing, there can be provided a lens barrel mechanism which is capable of reducing the size of a unit for performing light blocking and dust proof without damaging functions of the light blocking and the dust proof, and capable of achieving reduction in its size.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A lens barrel mechanism comprising:
   a first optical unit;
   a second optical unit; and
   a bellows-shaped unit for performing light blocking and dust proof, said bellows-shaped unit being disposed between said first optical unit and said second optical unit so as to be expanded and contracted interlocking with relative movement in an optical axial direction between said first optical unit and said second optical unit;
   wherein said bellows-shaped unit is formed in a shape in conformity with the shape of inside surface of the second optical unit viewed from its front side so as to be movable relative to said second optical unit in the optical axis direction having a clearance therebetween, and one end of said bellows-shaped unit is fixed to said first optical unit, and
   wherein the movement of said bellows-shaped unit in the optical axial direction relative to said second optical unit is regulated by different regulating portions of said second optical unit between cases where said bellows-shaped unit is contracted and where said bellows-shaped unit is expanded.

2. A lens barrel mechanism according to claim 1, wherein said second optical unit includes a cam pin which moves in the optical axial direction in engagement with and guided by a cam and a guide groove provided in an outer cylinder, and said different regulating portions one of which extends toward an inner circumferential side of said second optical unit, and the other of which is a portion of said cam pin protruding toward the inner circumferential side of said second optical unit.

3. A lens barrel mechanism according to claim 1, wherein said first optical unit and said second optical unit are moved relative to each other in the optical axial direction when a local length is changed, in the event that a condition is changed from a condition under which said first optical unit and said second optical unit are both contained in an outer cylinder to a condition under which the focal length is set to a wide-angle side, said first optical unit is moved rearward in the outer cylinder from a position of said contained condition to a position whereat the other end of said bellows-shaped unit impinges said regulating portion which is a portion of a cam pin protruding toward an inner circumferential side of said second optical unit, while said second optical unit is moved forward relative to the outer cylinder, and in the event that the focal length is set to a telephoto side, said second optical unit remains at the forward moved position, while said first optical unit is moved forward to a position whereat the other end of said bellows-shaped member impinges said regulating portion which is a portion which extends toward the inner circumferential side of said second optical unit.

4. A camera characterized by a lens barrel mechanism recited in claim 1.

5. A lens barrel mechanism characterized in that a bellows-shaped unit for performing light blocking and dust proof is disposed between a first unit and a second unit which are movable relative to each other in an optical axial direction of a lens barrel, a first portion of said bellows-shaped unit is fixed to said first unit, a second portion of said bellows-shaped unit is mounted to said second unit such that said second portion can be moved in the optical axial direction relative to said second unit, and said second portion of said bellows-shaped unit can be regulated in the optical axial direction by different portions of said second unit between cases where said bellows-shaped unit is contracted and where said bellows-shaped unit is expanded, interlocking with the relative movement in the optical axial direction of said first unit and said second unit, and wherein said second portion of said bellows-shaped unit is formed in a shape in conformity with the shape of inside surface of the second unit viewed from its front side so as to be movable relative to said second unit in the optical axis direction having a clearance therebetween.

6. A lens barrel mechanism according to claim 5, wherein said second unit is an optical unit provided at a front end of said lens barrel, said regulating portion at the time of expansion is a portion of a cam pin protruding toward an inner circumferential side, and said cam pin supports and guides said optical unit in the optical axial direction.

* * * * *

UNITED STATES PATENT AND TRADEMARK OFFICE
CERTIFICATE OF CORRECTION

PATENT NO.        : 6,967,784 B2                                          Page 1 of 1
APPLICATION NO.   : 10/763988
DATED             : November 22, 2005
INVENTOR(S)       : Kazushige Ichino It is certified that error appears in the above-identified patent and that said Letters Patent is hereby corrected as shown below:

Column 8, line 18, delete "local length" and insert --focal length--

Signed and Sealed this

Twenty-fifth Day of July, 2006

JON W. DUDAS
*Director of the United States Patent and Trademark Office*